Figure 1:
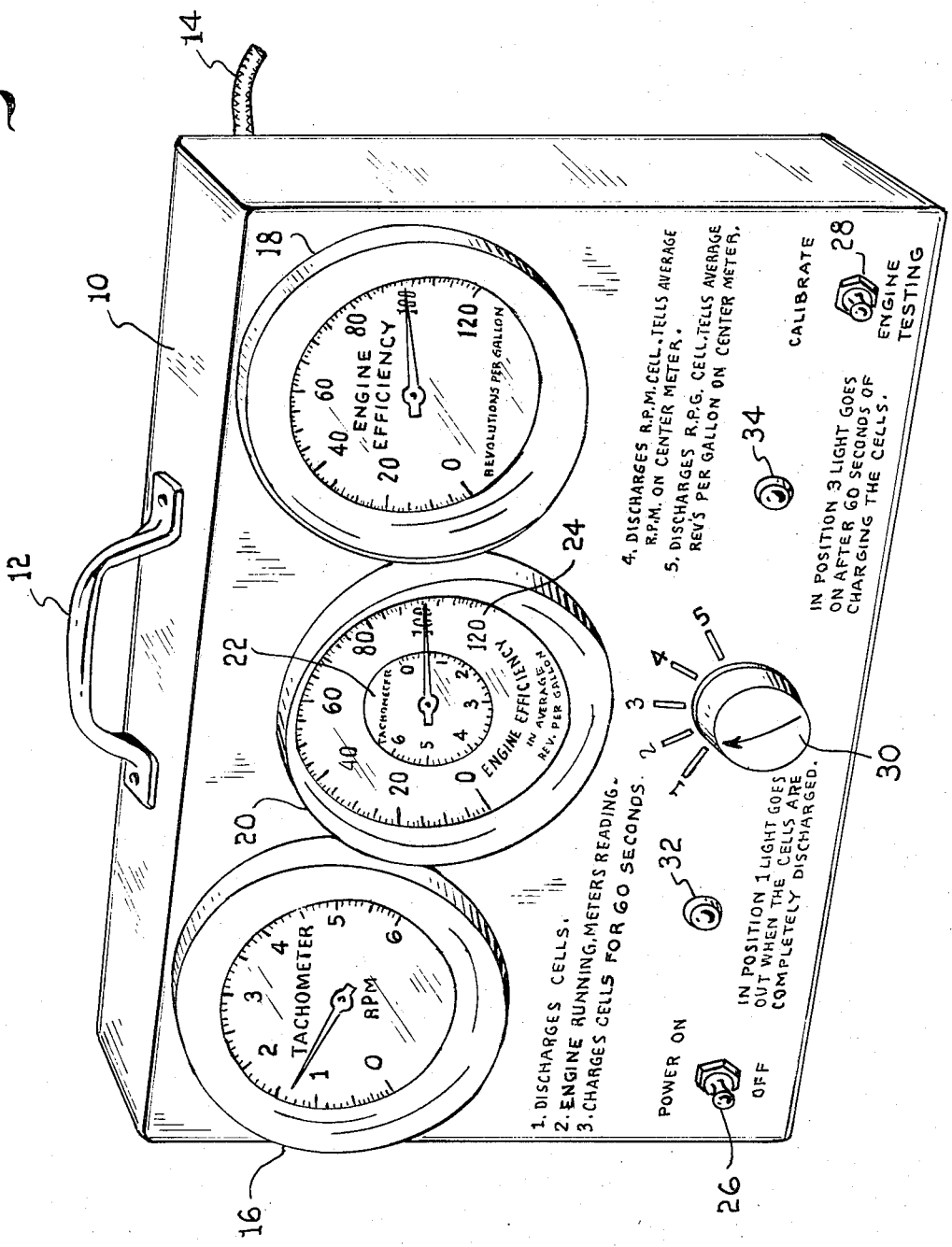

United States Patent [19]
Sorenson

[11] 3,812,711
[45] May 28, 1974

[54] ENGINE EFFICIENCY DETERMINING APPARATUS

[76] Inventor: Perc C. Sorenson, 1431 Underwood Ave., Milwaukee, Wis. 53213

[22] Filed: Sept. 20, 1972

[21] Appl. No.: 290,450

[52] U.S. Cl. ............................................. 73/114
[51] Int. Cl. ....................................... G01m 15/00
[58] Field of Search ............. 73/112, 113, 114, 116

[56] References Cited
UNITED STATES PATENTS

| | | | |
|---|---|---|---|
| 2,941,397 | 6/1960 | Lee | 73/114 |
| 3,118,302 | 1/1964 | Fathauer | 73/114 |
| 3,564,382 | 2/1971 | King et al. | 320/44 |

*Primary Examiner*—Richard C. Queisser
*Assistant Examiner*—Anthony V. Ciarlante
*Attorney, Agent, or Firm*—Olson, Trexler, Wolters, Bushnell & Fosse, Ltd.

[57] ABSTRACT

In accordance with the present invention, apparatus is provided for determining instant readings of revolutions per minute (r.p.m.) and engine efficiency (ratio of fuel input to engine revolutions) and an averaged reading of r.p.m. and engine efficiency. The apparatus provides electrolytic cells forming a first energy reservoir into which energy is introduced proportional to the r.p.m. of the engine and a second energy reservoir into which energy is introduced proportional to engine efficiency, for a predetermined length of time. The introduced energy is then extracted from the reservoirs while a corresponding registration is obtained, such registration thereby being an average of engine r.p.m. and of engine efficiency under the given operating conditions.

9 Claims, 2 Drawing Figures

ENGINE EFFICIENCY DETERMINING APPARATUS

This invention relates to means and methods for determining engine efficiency, particularly that of internal combustion engines.

Means and methods have heretofore been provided for determining engine efficiency, in terms of r.p.m. or in miles per gallon, particularly with reference to internal combustion engines. However, most of these devices involve the continuous reading of meters or the like, during fluctuating operating conditions, resulting in a degree of indefiniteness which in turn results in a degree of insufficiency in the use of such devices.

In accordance with the apparatus of the present invention, an energy reservoir is provided, in the form of an electrolytic cell, into which energy is introduced for a predetermined length of time. Indicator means is provided, operable during extraction of the electrical energy from the reservoir, whereby the indicator means provide a measure of averaged r.p.m. and averaged engine efficiency in terms of revolutions-per-gallon, or miles-per-gallon, in the particular preferred embodiment set forth.

It is accordingly an object of the present invention to provide improved means and methods for measuring engine efficiency, particularly useful with internal combustion engines, wherein a more readily operable means is provided for producing a definite indication of the measured engine efficiency. More particularly stated, it is an object of the present invention to provide, in apparatus of the type set forth, an indication means which provides a definite measurement of how the engine converts fuel into engine revolutions which is very specifically engine efficiency in terms of revolutions-per-gallon, from which definite mathematical records may be made and retained as the standard of engine efficiency for each individual vehicle engine.

A further object of the invention is to provide improved means for reading or determining an average r.p.m. in an engine being tested.

A preferred embodiment of the invention is set forth for the purpose of illustration.

Figure 2:
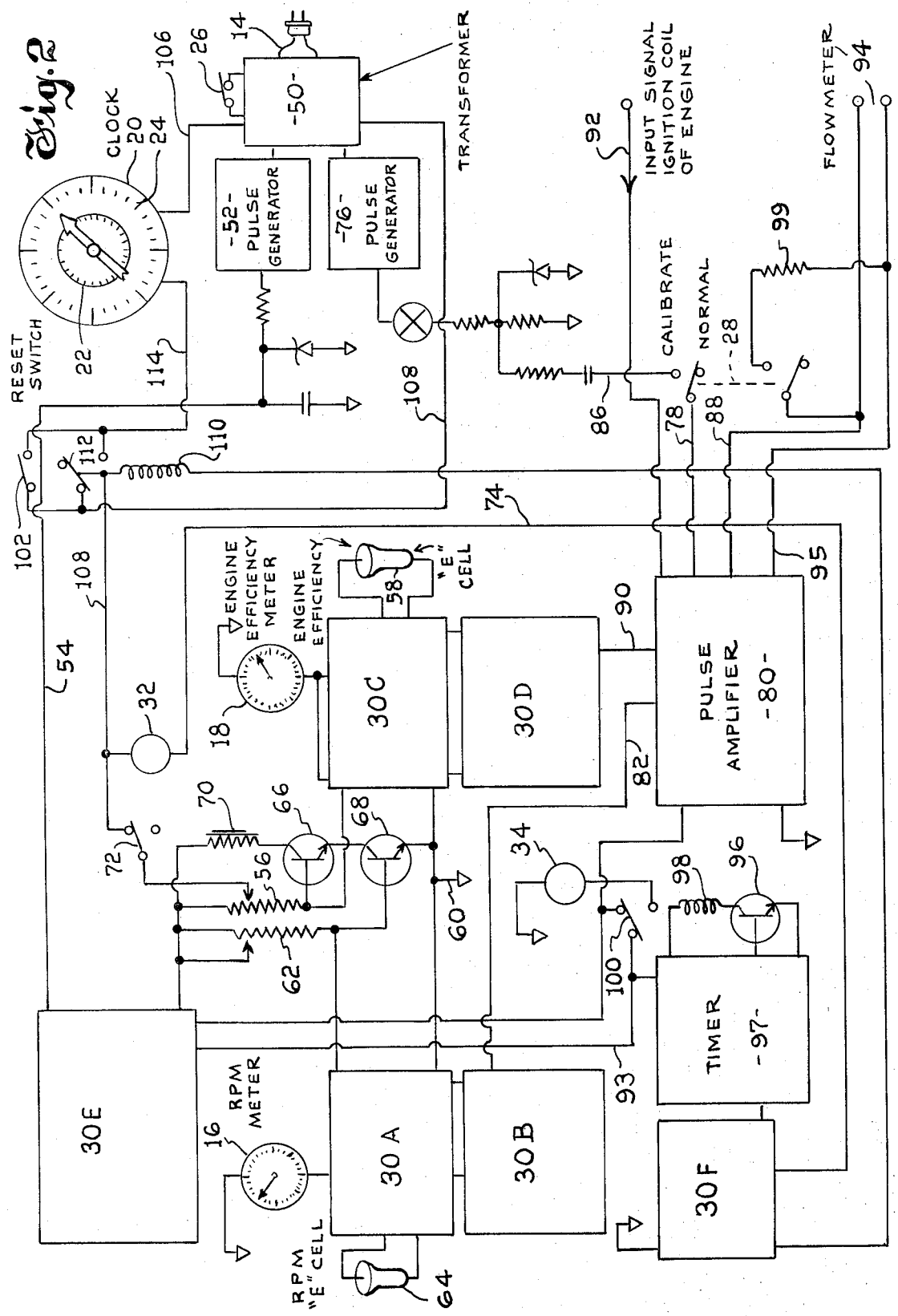

In the drawings, wherein like reference numerals refer to like parts throughout:

FIG. 1 is a perspective view of an engine efficiency determining apparatuS constructed in accordance with the invention, in accordance with one preferred embodiment thereof; and FIG. 2 is a schematic diagram of a suitable electric circuit for the device illustrated in FIG. 1.

Referring more particularly to the drawings, and first to FIG. 1, the apparatus comprises a casing 10, portable by means of a handle 12, and arranged for connection with a 110-volt AC power supply source by means of cable 14.

The apparatus further comprises a tachometer indicator 16, an engine efficiency indicator 18, and a time integrator indicator 20, having an inner tachometer dial 22 and an outer engine efficiency dial 24.

The apparatus further comprises a main control switch 26; a calibrate switch 28 having an upper "calibrate" position and a lower "engine testing" position; and a selector switch 30 having five selector positions as shown. There is further provided an indicator light (red) 32, and an indicator light (green) 34, the purpose of which will presently appear.

Internally of the casing 10 there are provided two electrolytic cells specifically in the form of E cells comprising electrical energy reservoirs, associated respectively with the tachometer and engine efficiency circuits of the apparatus. These E cells, which are essentially charge storage devices, operate as electrical energy storage reservoirs, viz., as positive current is applied thereto an electroplating action takes place within the E cells in proportion to the current applied, and upon the application of a reverse current a deplating action occurs, until the deplating is complete.

It is believed that a summary statement of the operation will be helpful before reference is made to the details of the electric circuit shown in FIG. 2. In operation, when the apparatus has been connected with a source of power supply by means of the line cord 14, and the main switch 26 has been turned on, and with the selector switch 30 in position "No. 1," a deplating action occurs within the E cells (58 and 64, FIG. 2), and during such deplating action the red indicator light 32 is lighted. When the E cells have been completely discharged, or deplated, the red indicator light 32 goes out, and the apparatus has now been conditioned for testing use.

Upon movement of the selector switch 30 to position "No. 2," and with the switch 28 in its lower "engine testing" position, the voltage from the 110-volt AC power source is converted to 12-volt DC and applied to a pulse amplifier (80 FIG. 2) which has a connection from the ignition coil of the engine to be tested for generating signals having a frequency proportional to engine speeds. The pulse amplifier supplies a corresponding milliampere current to the tachometer indicator 16 equivalent to the engine speed the operator chooses, which in the present illustrative embodiment may be 1,800 r.p.m.

The measurement of the fuel consumption of the engine being tested is supplied to the pulse amplifier by a flowmeter transducer in the fuel line as set forth in my prior U.S. Pat. No. 3,253,459, entitled Miles Per Gallon Meter, and dated May 31, 1966. The energy representative of engine speed from the pulse amplifier is applied to the flowmeter transducer and the output therefrom is routed to the engine efficiency meter 18, as in said prior patent, so as to give a reading of engine efficiency. As stated, the operator positions the engine throttle to any r.p.m. he desires for testing, in this particular embodiment set forth, an engine speed of 1,800 revolutions-per-minute (which is 108,000 revolutions-per-hour). A ratio of 2 gallons of fuel-per-hour selected for illustration in this embodiment, divided into 108,000 revolutions-per-hour, is engine efficiency of 54,000 revolutions-per-gallon. The corresponding electrical values in this particular embodiment are 1,687.5 millivolts for 108,000 revolutions-per-hour divided by 3,750 ohms representative of 2 gallons fuel flow, to give 0.45 milliamperes for 54,000 revolutions-per-gallon engine efficiency.

Conditions having reached a steady state, or reasonably steady state in switch position 2 stated above, the operator now moves the selector switch 30 to position "No. 3." In this position the energy being applied to the tachometer 16, is also applied to the tachometer E cell; and the energy being applied to the engine efficiency meter of indicator 18 is also applied to the engine efficiency E cell; and this action continues for a predetermined length of time under timer control, one minute in the particular embodiment set forth. At the end of the one minute interval, the timer terminates the electric plating action taking place in the two E cells and at the same time lights the green light 34 to indicate that the charging of the E cells has been completed.

The hand of the clock 20 having been preset to 0 r.p.m., the selector switch 30 is now turned to position "No. 4," and in this position the tachometer E cell is deplated while the hand sweeps the tachometer dial 22 of clock meter 20, and this action continues until the tachometer E cell has been completely deplated or exhausted of its electrical charge, whereupon the action stops and the clock stops. The distance which it travels represents the amount of energy which was stored in the tachometer E cell during the one minute test accumulation period. In this particular embodiment, the clock hand will stop at 1,800 r.p.m.

The tachometer reading having been recorded or otherwise preserved, and the clock hand having been restored to 0 position on the engine efficiency scale 24, the operator now turns selector switch 30 to its "No. 5" position; whereupon the operation is repeated with respect to the engine efficiency E cell; viz., a deplating action occurs within the E cell, until its charge is exhausted, and during this period the clock hand sweeps the engine efficiency dial 24 of meter 20, giving a reading of "engine efficiency" for the one minute accumulation test period. In this particular embodiment the clock hand will stop at 54,000 revolutions per gallon engine efficiency.

It will be seen that the objects of the invention are thus accomplished, viz., an accurate "average" reading is obtained for engine speed and for engine efficiency during the test period; and the figures obtained can be established as the standard of engine efficiency for the engine and recorded and retained, thus providing an accurate mathematical determination of engine efficiency.

A suitable electrical circuit is set forth in FIG. 2. Line current is delivered from the line cord 14 through the main switch 26 to a transformer as indicated diagrammatically at 50. Low voltage is delivered therefrom to a pulse generator 52, from which a predetermined direct current voltage, for example twelve volts, is continuously delivered.

The selector switch 30 has six banks of contacts as indicated at 30A, 30B, 30C, 30D, 30E, and 30F. In position "No. 1" of the selector switch, current is delivered from the pulse generator 52, through a line 54 to the bank of contacts 30E of the selector switch, and thence through potentiometer 56 and the contact bank 30C, to effect discharge of the engine efficiency E cell 58, through ground connection 60. Simultaneously current is delivered to potentiometer 62 to the switch contacts 30A to effect discharge of the r.p.m. E cell 64, in like manner. When both E cells have been completely discharged, transistors 66 and 68 function to operate relay 70, thus operating contacts 72 cutting off current to the red light 32, extinguishing the light indicating that the discharge of the cells has been completed, as previously described. As will be understood, prior thereto, the circuit to the light 32 was completed through line 74 and the ground selection contact bank 30F of the selector switch.

Upon movement of the selector switch to position "No. 2," as previously described, and with the switch 28 in its "engine test position," as shown in FIG. 2, a frequency representative of the engine speed, is delivered from the input signal of the ignition coil of the engine through line 92 to pulse amplifier 80. More particularly, voltage from the 110 AC power source is converted to 12-volt DC and applied through line 93 to the pulse amplifier 80 which thereupon supplies milliampere current to the r.p.m. meter 16 in accordance with the frequency of the ignition coil, as previously described. In this particular embodiment this is set forth as a speed of 1,800 r.p.m. With the switch 28 in its "engine test position," current representative of a fuel consumption of 2 gallons per hour, as previously stated, is delivered from flowmeter 94 through line 95, and line 88 to the pulse amplifier 80. This in turn is routed by the pulse amplifier through line 90 to the switch contacts 30D and 30C and thence to the engine efficiency meter 18, as previously described.

Upon movement of selector 30 into position "No. 3," the switch contacts 30E connect the voltage supply line 54 with a line 93 leading to the timer 97 which, as previously described, is preset for a one minute or any other time interval desired. Simultaneously the switch contacts 30A and 30C function to apply the currents from lines 82 and 90 respectively to the r.p.m. E cell 64, and the engine efficiency E cell 58, to effect a plating action therein proportional to the energy received. At the expiration of the one minute interval, transistor 96 functions to operate a relay 98 which in turn functions to operate contacts 100, to interrupt the operation and simultaneously light the green light 34, to indicate that the accumulation has been completed.

A reset switch for the clock is indicated at 102, which may be operated at any time (except when selector switch 30 is in positions "No. 4" or "No. 5") to reset the clock hand to any desired starting position. The reset switch while closed delivers current through the clock from the supply line 106, and returns to the source of supply through line 108.

Upon movement of the selector switch 30 to position "No. 4" switch contacts 3E are shifted to deliver an opposite current for deplating of the r.p.m. E cell through potentiometer 62. When the deplating action has been completed, transistor 68 functions, also as previously described, to operate relay 70 and contact 72, to deenergize the circuit. Prior to the deenergization, current from the contacts 72 is supplied through line 108 to a relay 110 so as to hold its contacts 112 in down or "on" position so that the clock 20 is operated during such period through its connection with the supply line 114, whereby the clock hand is moved a distance proportional to the time employed in the deplating of the E cell.

Upon movement of the selector switch 30 to its "No. 5" position, a similar action occurs through potentiometer 56 to effect the deplating of the engine efficiency E cell 58, and when the operation is complete transistor 66 functions again to operate relay 70 and contacts 72 and 112, as previously described. Assuming that the clock hand has been reset to start from its "zero" engine efficiency position, the distance which it moves during the deplating action is representative of the energy which was stored in the engine efficiency E cell 58.

The engine efficiency tester has a system "built-in" to test itself for accuracy and for calibration. Fixed values are substituted for the signals of fuel flow and engine speed with the switch 28 in "calibrate" position.

More particularly, the line voltage is delivered through the transformer 50 and routed through pulse generator 76 and lines 86 and 78 to pulse amplifier 80 and through contacts 30D and 30C to provide a fixed 1,800 r.p.m. reading on meter 16. At the same time, the switch 28 disconnects the flowmeter 94 and substitutes a fixed resistance 99 of 3,750 ohms, (the equivalent of two gallons of fuel flow) through line 88 to the pulse amplifier 80, to provide a reading of 54,000 engine efficiency on meter 18. With these fixed values, the tester is run through its five positions, and the tester must read 1,800 r.p.m. on the r.p.m. meter 16 and 54,000 on the engine efficiency meter 18. It must show an accurate timing of sixty seconds duration and the averaged readings on the clock 20 to be 1,800 r.p.m. on the tachometer dial 22 and 54,000 revolutions-per-gallon on the engine efficiency dial 24.

The invention is claimed as follows:

1. Engine efficiency determining apparatus comprising electrical means having electrical energy input proportional to the engine speed, electrical energy input proportional to the amount of fuel consumption and electrical energy output representative of a ratio of engine speed and engine fuel consumption, an electrolytic cell forming an electrical energy storage reservoir, means for storing said energy output within said reservoir from said electrical means during a first cycle of operation, means for extracting the stored energy from said reservoir during a second cycle of operation, and means for measuring the extracted energy to thereby provide a measure of engine efficiency.

2. Engine efficiency determining apparatus as defined in claim 1 wherein one of said electrical inputs is output from a pulse generator driven by the engine.

3. Engine efficiency determining apparatus as defined in claim 1 wherein one of said electrical inputs is output from a variable resistor controlled by the flow of fuel to the engine.

4. Engine efficiency determining apparatus as defined in claim 1 wherein said electrical energy storage means comprises an E cell.

5. Engine efficiency determining apparatus as defined in claim 1 wherein there is additionally provided a second electrical storage reservoir in the form of an electrolytic cell, and means for producing and storing energy within said second reservoir in accordance with engine speed.

6. Engine efficiency determining apparatus as defined in claim 5 wherein said second electrical storage reservoir comprises an E cell.

7. Engine efficiency determining apparatus as defined in claim 1 wherein a timer is provided for controlling the length of operation of the energy storing means.

8. Engine efficiency determining apparatus as defined in claim 1 wherein said means for measuring the extracted energy includes a clock mechanism.

9. Engine efficiency determining apparatus, comprising an electrolytic cell forming separate means for storing electrical energy in proportion to engine output speed and to a ratio of fuel consumption to engine output for a predetermined test period during a first cycle of operation where said electrical energy in proportion to said ratio is output energy from an electrical means having electrical energy input proportional to the engine speed and electrical energy input porportional to the amount of fuel consumption, and means to convert the stored energy in each of said first named means into readable data during a second cycle of operation to give the average engine speed and the average engine efficiency for said test period.

* * * * *